(12) United States Patent
Kralick

(10) Patent No.: US 6,350,535 B1
(45) Date of Patent: Feb. 26, 2002

(54) MIST EVAPORATION SYSTEM FOR FUEL CELL HYDRATION

(75) Inventor: James H. Kralick, Albany, NY (US)

(73) Assignee: Plug Power Inc., Latham, NY (US)

(\*) Notice: Subject to any disclaimer, the term of this patent is extended or adjusted under 35 U.S.C. 154(b) by 0 days.

(21) Appl. No.: 09/384,092

(22) Filed: Aug. 27, 1999

(51) Int. Cl.$^7$ ............................................... H01M 8/04
(52) U.S. Cl. ............................................ 429/13; 429/26
(58) Field of Search ..................................... 429/13, 26

(56) References Cited

U.S. PATENT DOCUMENTS

| | | | |
|---|---|---|---|
| 3,313,656 A | 4/1967 | Blomgren et al. | |
| 3,556,857 A | 1/1971 | Poirier et al. | |
| 4,473,622 A | * 9/1984 | Chludzinski et al. | ..... 429/26 X |
| 4,582,765 A | 4/1986 | Kothmann | ................... 429/13 |
| 4,585,708 A | 4/1986 | Abens et al | ................... 429/17 |
| 4,722,873 A | 2/1988 | Matsumura | ................... 429/24 |
| 4,769,297 A | 9/1988 | Reiser et al. | ................. 429/17 |
| 4,994,331 A | 2/1991 | Cohen | ......................... 429/17 |
| 5,206,094 A | 4/1993 | Katz | ........................... 429/26 |
| 5,316,643 A | 5/1994 | Ahn et al. | ................... 204/265 |
| 5,432,020 A | 7/1995 | Fleck et al. | .................. 429/13 |

FOREIGN PATENT DOCUMENTS

| | | |
|---|---|---|
| GB | 934416 | 8/1963 |
| JP | 06-111841 | * 4/1994 |

\* cited by examiner

*Primary Examiner*—Stephen Kalafut
(74) *Attorney, Agent, or Firm*—Heslin Rothenberg Farley & Mesiti P.C.

(57) ABSTRACT

A system for humidifying reactant gas for a fuel cell includes a supply line for supplying reactant gas to a fuel cell, a mist humidifier for producing liquid droplets in the reactant gas, and an evaporator for evaporating the liquid droplets. The evaporator may use a portion of the heat generated by operation of the fuel cell for evaporating the liquid droplets.

19 Claims, 5 Drawing Sheets

MIST EVAPORATION SYSTEM FOR FUEL CELL HYDRATION

TECHNICAL FIELD

This invention relates generally to fuel cells and, more particularly, to humidification of reactant gases in fuel cells for membrane hydration.

BACKGROUND INFORMATION

Fuel cells electrochemically convert fuels and oxidants to electricity. A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant fluids (e.g., hydrogen and air/oxygen gases). The direction, from anode to cathode, of flow of protons serves as the basis for labeling an "anode" side and a "cathode" side of every layer in the fuel cell, and in the fuel cell assembly or stack.

In general, an individual PEM-type fuel cell may have multiple, generally transversely extending layers assembled in a longitudinal direction. In a typical fuel cell assembly or stack, all layers which extend to the periphery of the fuel cells have holes therethrough for alignment and formation of fluid manifolds that generally service fluids for the stack. Typically, gaskets seal these holes and cooperate with the longitudinal extents of the layers for completion of the fluid supply manifolds. As may be known in the art, some of the fluid supply manifolds distribute fuel (e.g., hydrogen) and oxidant (e.g., air/oxygen) to, and remove unused fuel and oxidant as well as product water from, fluid flow plates which serve as flow field plates of each fuel cell. Other fluid supply manifolds circulate coolant (e.g., water) for cooling the fuel cell.

In a typical PEM-type fuel cell, the membrane electrode assembly (hereinafter "MEA") is sandwiched between "anode" and "cathode" gas diffusion layers (hereinafter "GDLs") that can be formed from a resilient and conductive material such as carbon fabric or paper. The anode and cathode GDLs serve as electrochemical conductors between catalyzed sites of the PEM and the fuel (e.g., hydrogen) and oxidant (e.g., air/oxygen) which flow in respective "anode" and "cathode" flow channels of respective flow field plates.

The PEM can work more effectively if it is wet. Therefore, once any area of the PEM dries out, the fuel cell does not generate any product water in that area because the electrochemical reaction there stops. Undesirably, this drying out can progressively march across the PEM until the fuel cell fails completely.

Attempts have been made to hydrate the PEM by raising the humidity of the incoming reactant gases. That is, the fuel and/or oxidant gases are humidified with water, comprising liquid water droplets, for example, atomized droplets from a mist humidifier, before entering the fluid supply manifolds for humidification of the PEM of the fuel cell. In the past it was thought that, once the water entered the active section of the fuel cell, it would evaporate to saturate the reactant gas, promoting hydration of the PEM. However, it is now believed that in such a system, some of the non-evaporated liquid water droplets, having cross sections larger than the fuel channels, actually adhere to the sidewalls of the channels and cause localized flooding of the fuel cell. Also, when water changes phase from a liquid to a gas, energy is required to facilitate this reaction. This is known as the latent heat of vaporization. This absorption of energy causes the temperature of the incoming gases to decrease as some of the water droplets are evaporated, thereby leading to further condensation and flooding, since water will tend to condense from a saturated gas as it cools.

Deleterious effects can also result from turns in the flow path of a stream which is a mixture of liquid water droplets and reactant gas (e.g., two-phase flow). After the stream goes around a given curve, separation of the water from the reactant gas occurs. Anytime the stream changes direction and/or velocity, the various settling rates yield separation. Therefore, by the time the stream reaches the end of such a flow path, much of the liquid water may have settled out. Similar problems and unpredictability can result in any unconstrained flow of water mixed with reactant gas.

Attempts have also been made to introduce a water vapor into the reactant gas streams, for example, by steam injection. Typically this was accomplished by using an external heat source to heat liquid water into vapor. The vapor was then introduced into the reactant gas stream, and into the fuel cell. This process is inefficient since it requires external heat energy to be introduced into the system. Furthermore, the incoming temperature of the reactant gas is high, and this added heat load needs to be removed by the coolant circulating throughout the fuel cell. The increased load on the cooling cycle requires more energy to reduce the temperature of the coolant prior to being re-circulated through the fuel cell. These increased energy requirements are inefficient and costly. Accordingly, it is desirable to provide efficient, adequate hydration to all the fuel cells in the stack.

SUMMARY OF THE INVENTION

In an exemplary embodiment of the invention, a system for humidifying a reactant gas for a fuel cell comprises a supply line for supplying reactant gas to a fuel cell, a mist humidifier to produce liquid droplets in the reactant gas, and an evaporator to evaporate the liquid droplets in the reactant gas prior to the reactant gas entering the active section of a fuel cell; the evaporator uses heat removed by the cooling cycle of the fuel cell for evaporation of the liquid droplets.

This system has a number of advantages. The mist humidifier provides a mist of liquid droplets into the reactant gas. The mist is then evaporated by use of discharge heat from the fuel cell. This provides humidified reactant gas to the fuel cell for hydration of the PEM, while reducing the heat reduction load on the fuel cell assembly. As another advantage, the use of excess heat for evaporation of the mist into the reactant gas, serves to decrease the temperature of the coolant, so re-circulation of the coolant back into the fuel cell assembly requires less energy in the coolant re-circulation loop to effect cooling of the fuel cell assembly.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

DETAILED DESCRIPTION

Figure 1:
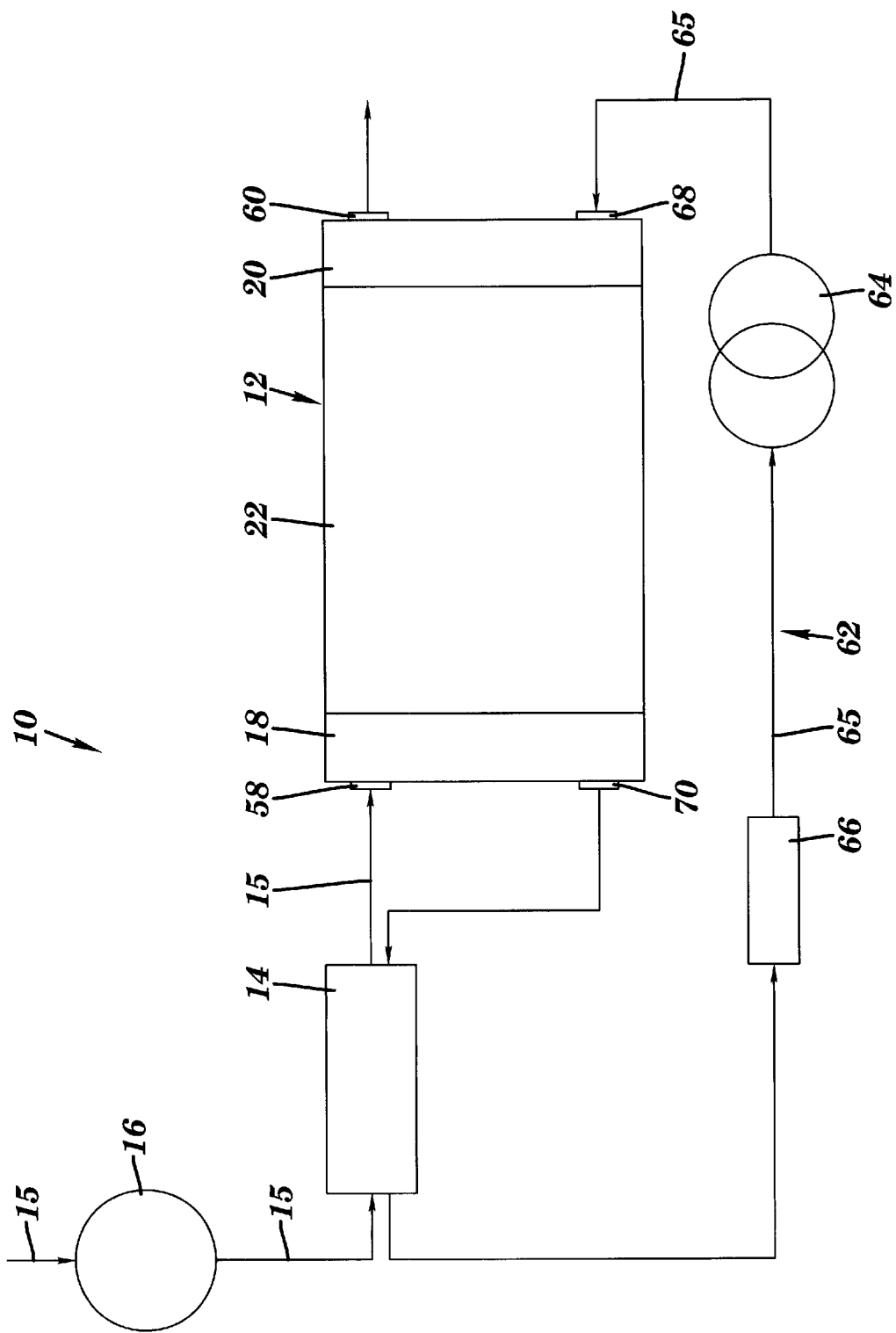
FIG. 1 is a schematic diagram depicting a mist evaporation humidification system in accordance with the present invention.

Referring to FIG. 1, a fuel cell hydration system 10 is illustrated. Fuel cell hydration system 10 comprises a fuel cell stack 12, an evaporator 14, and a mist humidifier 16. Fuel cell stack 12 typically will include end plates 18 and 20, and a working section 22 therebetween. The working section may include one or more active sections and can include a selected number of cooling sections, as will be understood by those skilled in the art.

Working section 22 includes a number of individual fuel cells (not shown) which generally form fluid manifolds for supplying reactant gas or fluids to, removing fluids from, and otherwise communicating and/or servicing fluids as desired within working section 22. A reactant gas supply line 15 supplies the reactant gases necessary for operation of the fuel cell hydration system. Supply line 15 may comprise a plurality of individual lines for supplying reactant gases to fuel cell stack 12. Supply line 15 may be preferably constructed from non-corrosive stainless-steel or polypropylene, or any other suitable material as may be known in the art. In the context of this invention a reactant gas may be any substance which is classified as a fuel, such as substantially pure hydrogen, methanol reformate or natural gas reformate, or any substance classified as an oxidant such as substantially pure oxygen or oxygen containing air, as may be known in the art. Fuel cell stack 12 also preferable includes exhaust manifolds and outlet ports for expelling un-reacted fuel and oxidant gases, each carrying entrained water. It will be appreciated by those of skill in the art that the system may further include water traps (not shown) for collecting liquid water condensing or accumulating in the system.

Supply line 15 carries the incoming reactant gas stream to mist humidifier 16. Mist humidifier 16 produces and introduces water droplets, into the incoming reactant gas stream, in the form of a fine mist. The mist droplets are fine enough to be carried by the reactant gas stream into the fuel cell stack. A suitable ultrasonic mist humidifier is commercially available from DGH Systems, Inc. sold under model number US2000. Alternatively, high frequency shockwaves may be sent through standing water, and upon the exit of the shockwave from the free surface of the standing water a fine mist of liquid water droplets in the range of 0–5 microns in diameter, and preferably in the range of 0.5 to 1.5 microns is produced. By using higher frequency shockwaves smaller water droplets may be produced. As yet another alternative, spray nozzles, which may use a high pressurization system, or use normal system pressure, may be used to inject a mist of liquid droplets into the incoming reactant gas stream. Such spray nozzles are commercially available and are known to those of skill in the art.

The reactant gas stream carrying liquid water droplets, is then carried by supply line 15 to evaporator 14. Evaporator 14 may be a tube and shell heat exchanger, or any other known heat exchanger capable of evaporating the liquid water droplets produced by mist humidifier 16 into the reactant gas stream. A suitable shell and tube heat exchanger type evaporator is commercially available from Exergy, Inc., model number 00486-2. Evaporator 14 preferably uses rejected heat from the coolant cycle of fuel cell stack 12, as will be described in further detail hereafter. The vapor and reactant gas mixture is then carried by supply line 15 to fuel cell stack 12 for use.

Figure 2:
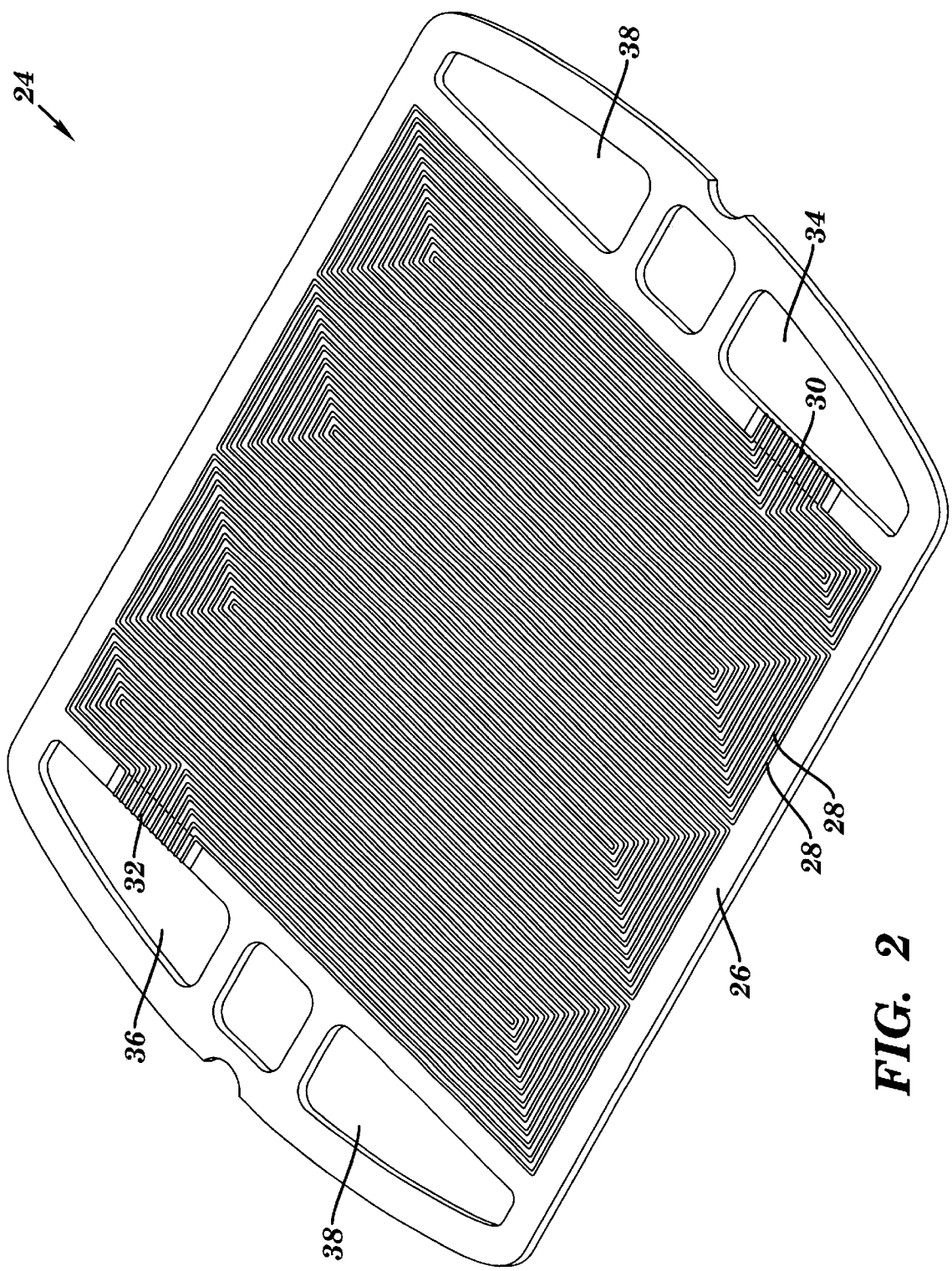
FIG. 2 is a plan view of a surface of one embodiment of a fluid flow plate for use in the fuel cell stack assembly shown in FIG. 1.

One example of an individual fuel cell, of working section 22 is depicted in FIG. 2 as a fluid flow plate 24. Fluid flow plate 24 has a fluid flow face 26 with at least one generally serpentine flow channel 28 thereon. Flow channel 28 receives and transmits one or more fluids through an inlet 30 and out an outlet 32 which are in fluid communication with corresponding fluid entry manifold 34 and fluid exit manifold 36.

Fluid flow plate 24 may be a bipolar, monopolar, or combined monopolar (e.g., anode cooler or cathode cooler). In one example, fluid flow plate 24 serves as a flow field plate and flow channel 28 conducts fluid which includes reactant gas for fuel cell stack 12. The reactant gas serves as fuel or oxidant for a given fuel cell. For instance, the flow channel can carry reactant gas as well as a liquid (e.g., humidification vapor and/or product water).

With reference still to FIG. 2, fluid flow plate 24 has a number of peripheral holes 38 therethrough, which can cooperate in formation of fluid supply manifolds of fuel cell stack 12, for supply of reactant gas to the opposite side of fluid flow plate 24.

Figure 3:
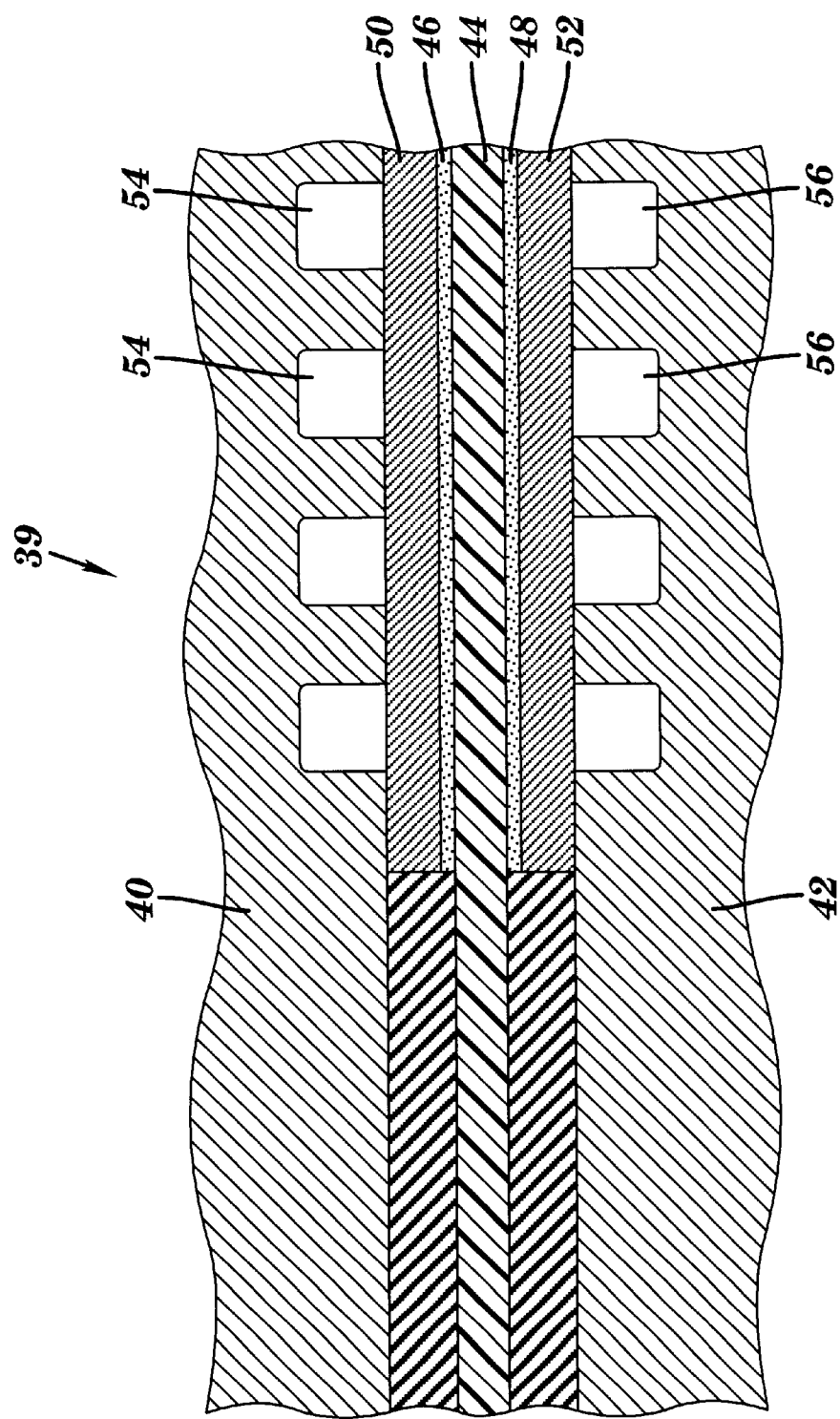
FIG. 3 is a partial, enlarged, sectional, side elevation view of the fluid flow plates and a fuel cell of the fuel cell stack assembly shown in FIG. 1.

For purposes of illustration, FIG. 3 depicts fuel cell 39 with fluid flow plates 40 and 42 serving as flow field plates. In particular, fluid flow plate 40 might serve as an anode side of the fuel cell, and fluid flow plate 42 might serve as a cathode side of the fuel cell. Fuel cell 39 includes a membrane or solid electrolyte 44. Preferably, solid electrolyte 44 is a solid polymer electrolyte made using a polymer such as a material manufactured by E. T. DuPont de Nemours Company and sold under the trademark NAFION® sulphonated fluorocarbon polymer. Further, an active electrolyte such as sulfonic acid groups might be included in this polymer. Alternatively, solid electrolyte 44 may be formed with a product manufactured by W. L. Gore & Associates (Elkton, MD) and sold under the trademark GORE-SELECT® sulphonated fluorocarbon polymer, or any other suitable material as may be known in the art. Catalysts 46 and 48, which facilitate chemical reactions, are applied to the anode and cathode sides, respectively, of solid electrolyte 44. Catalysts 46 and 48 may be constructed from platinum or other materials known in the art. The solid electrolyte and catalyst unit may be referred to as a "membrane electrode assembly" (hereinafter "MEA"). The MEA might be formed with a product manufactured by W. L. Gore & Associates and sold under the trade designation PRIMEA 5510-HS membrane electrode assembly.

The MEA is sandwiched between anode and cathode gas diffusion layers (hereinafter "GDLs") 50 and 52, respectively, which may be formed with a resilient and conductive material such as carbon fabric or carbon fiber paper. Alternatively, gas diffusion layers 50 and 52 may be formed from a porous carbon cloth or paper infused with a slurry of carbon black and sintered with TEFLON® polytetrafluoroethylene material.

The anode and cathode GDLs serve as electrochemical conductors between catalyzed sites of solid electrolyte 44 and the fuel (e.g., hydrogen) and oxidant (e.g., air/oxygen) which each flow in anode and cathode flow channels 54 and 56, respectively. Further, the GDLs also present to the surfaces of the MEA a combination of microscopic porosity and macroscopic porosity. Microscopic porosity allows reactant gas molecules to pass generally longitudinally from the flow channel to a surface of the MEA. Macroscopic porosity allows product water formed at the cathode surface of the MEA to be removed therefrom by flowing generally longitudinally into the cathode flow channel, to prevent flooding of the catalyst particles.

Now referring to FIG. 1, humidified reactant gas enters fuel cell stack 12 at inlet 58. Inlet 58 may be fluidly connected to the fluid manifolds which supply fuel and/or oxidants to the fuel cells. Inlet 58 is schematically shown as a single opening with a single reactant gas stream entering, however this is done for exemplary purposes and inlet 58 may comprise a plurality of openings which allow for the transfer of various reactant gases or fluids to their respective fluid manifolds. Similarly, the reactant gases exit fuel cell stack 12 at outlet 60. The humidified reactant gas is supplied to flow channel 28 via fluid entry manifold 34. During operation the vapor within the reactant gas hydrates the MEA, thereby allowing the MEA to function effectively.

When in operation, the electrochemical reactions within fuel cell stack 12 generate heat which, in order to avoid overheating, may be removed by cooling cycle 62. Cooling cycle 62 may comprise a pump 64 and a heat exchanger 66 fluidly connected to fuel cell stack 12, via coolant supply line 65. Supply line 65 may be preferably made from a high temperature PVC material, or from other suitable material as may be known in the art. Pump 64 and heat exchanger 66 may be placed in various locations along supply line 65 and in varying order as may be necessary. Pump 64 circulates a coolant, for example de-ionized water or other heat transfer fluids such as the product known as THERMINOL® synthetic hydrocarbon heat transfer fluid available from Solutia, Inc., through an inlet 68, in fuel cell stack 12. Prior to entering inlet 68, the coolant has been cooled using heat exchanger 66. Heat exchanger 66 may be a fin heat exchanger and fan arrangement, or any type of suitable heat exchanger as may be known in the art, as an example, the coolant may enter fuel cell stack 12 at 65° C., flow through fuel cell stack 12 at a rate of about 15 gallons per minute (volume flow units), and exit at a temperature of about 70° C. By controlling heat exchanger 66, the operating temperature on fuel cell stack 12 may be controlled. The stack operating temperature is generally kept in a range of 50° C. to 150° C. and at a preferable range of about 65° C. to 70° C.

Upon discharge from outlet 70, the heated coolant is circulated to evaporator 14, where a substantial portion of the heat energy gained by the coolant, in cooling the fuel cell stack, is rejected into the incoming reactant gas stream. The rejected heat energy evaporates the liquid water droplets produced by mist humidifier 16. Evaporator 14 can be controlled to control the temperature of the incoming reactant gas at inlet 58. For example, evaporator 14 may have a bypass to control the amount of coolant passing through. An advantage of this system is that the saturated inlet gas temperature, at inlet 58, can be set to about the operating temperature of fuel cell stack 12. Otherwise, if the reactant gas entering inlet 58 was warmer than fuel cell stack 12, condensation might occur as the saturated gas was cooled to the stack temperature. Alternatively, if the reactant gas entering inlet 58 was cooler than fuel cell stack 12, the gas might then tend to evaporate water from the membrane as it passed through fuel cell stack 12, causing an undesirable drying effect.

Figure 4:
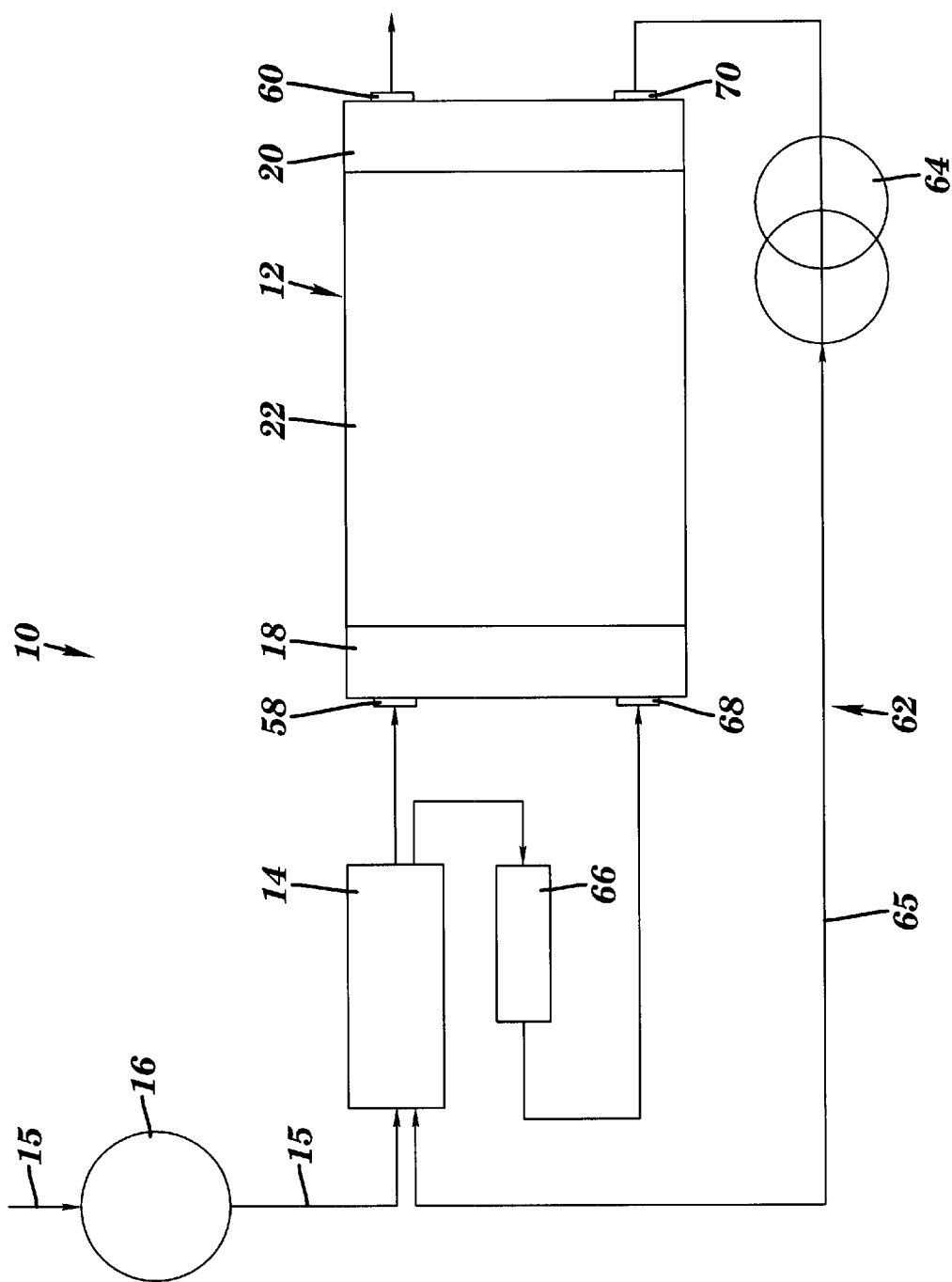
FIG. 4 is a schematic diagram depicting a mist evaporation humidification system in accordance with the present invention.

The coolant is then circulated to heat exchanger 66 for rejection of any remaining heat energy retained, thereby lowering the coolant to the desired inlet temperature, prior to re-entry into fuel cell stack 12. The cooling cycle illustrated in FIG. 1 circulates in the opposite direction of reactant gas stream. An alternative cooling cycle is shown in FIG. 4. The cooling cycle illustrated in FIG. 4 circulates in the same direction as the reactant gas stream.

As illustrated in FIG. 4, heated coolant exits fuel cell stack 12 at outlet 70. The heated coolant is carried via coolant supply line 65 to a pump 64, and then into evaporator 14. The heat energy from the coolant is transferred to the incoming reactant gas stream, carrying liquid water droplets, thereby evaporating the liquid water droplets into a vapor. FIG. 4 depicts the heated coolant and incoming reactant gas entering evaporator 14 on the same side, however this is for exemplary purposes and the heated coolant may enter from the same or the opposite side as the reactant gas. The heated coolant, now having a portion of its heat energy removed, is then circulated to heat exchanger 66. The size and capacity of heat exchanger 66 may be reduced due to removal of a significant amount of the heat load of the coolant. Once the coolant is lowered to the desired temperature it is circulated back through fuel cell stack 12. Alternatively pump 64 may be located at any position along coolant supply line 65.

It should also be considered that under the present invention, mist humidifier 16 and evaporator 14 can be combined into a single humidification and evaporation unit. It should also be considered that under the present invention, mist humidifier 16 and evaporator 14 may be located inside an inlet manifold (not shown) of fuel cell stack 12.

During operation, reactant gas stream 15 which is generally unsaturated with water vapor, is received in mist humidifier 16. As the reactant gas passes through mist humidifier 16, the dry reactant gas stream picks up liquid water droplets from the atomization of water within mist humidifier 16. The reactant gas water mixture exits mist humidifier 16 and is received in evaporator 14. The heat of the coolant passing through evaporator 14, evaporates the liquid water droplets contained within reactant gas stream 15. Since the liquid water droplets are in the form of a fine mist, they evaporate at a faster rate than larger sized liquid droplets or a liquid stream, therefore the heat energy supplied by the coolant is adequate for evaporation. The humidified reactant gas then proceeds to enter fuel cell stack 12.

Figure 5:
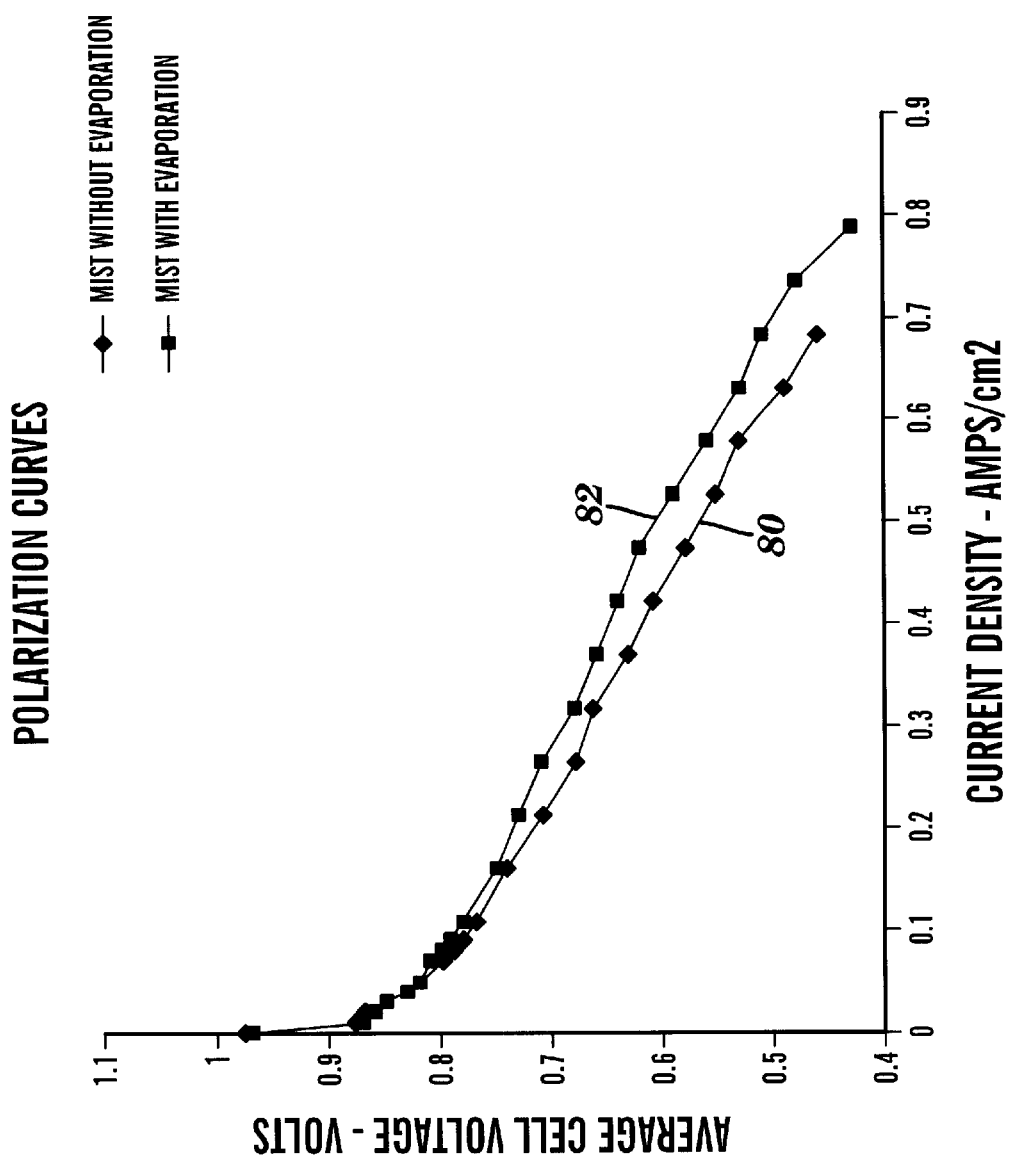
FIG. 5 is a polarization curve depicting performance of a mist evaporation humidification system in accordance with the present invention.

As an example, FIG. 5 shows a polarization curve representing the increase in performance of a PEM fuel cell utilizing the present invention. Line 80 represents a fuel cell with a cathode inlet stream humidified by a mist humidifier, and line 82 represents the same fuel cell where an evaporator is used in conjunction with the mist humidifier in accordance with the present invention. In both of the systems represented by lines 80 and 82, approximately the same amount of water is injected into the cathode inlet stream, the amount of water being enough to theoretically saturate the cathode inlet stream. As is evident by FIG. 5, the present invention provides increased fuel cell performance, i.e., a higher ratio of average cell voltage to current density.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of humidifying a fuel cell reactant gas comprising:

producing a mist of liquid water droplets in said reactant gas; and evaporating said mist using heat generated by operation of said fuel cell, said mist being completely evaporated prior to entry into said fuel cell.

2. A method as in claim 1, wherein said liquid droplets have a diameter less than 1.5 microns.

3. A method as in claim 1, wherein a portion of said heat generated by operation of said fuel cell is removed by a coolant, said coolant is circulated to an evaporator and said mist is evaporated in said evaporator, said evaporator using said portion of said removed heat to evaporate said liquid droplets.

4. A method as in claim 1, wherein said mist of liquid droplets is produced by a mist humidifier.

5. A method as in claim 4, wherein said mist humidifier comprises an ultrasonic humidifier.

6. A method as in claim 1, wherein said reactant gas is saturated with water vapor.

7. A method as in claim 3, further comprising:

controlling the evaporator to set a temperature of the reactant gas to substantially an operating temperature of the fuel cell.

8. A system for humidifying a reactant gas for a fuel cell, said fuel cell generating heat while in operation and a portion of said heat being removed by a collant, said system comprising:

a supply line for supplying said reactant gas to said fuel cell;

a mist humidifier to produce liquid water droplets in said reactant gas; and an evaporator to completely evaporate said liquid water droplets in said reactant gas prior to said reactant gas entering said fuel cell, said evaporator using said portion of said removed heat to evaporate said liquid droplets.

9. A system as in claim 8, wherein said mist humidifier comprises an ultrasonic humidifier.

10. A system as in claim 8, wherein said liquid droplets have a diameter less than 1.5 microns.

11. A system as in claim 8, wherein said evaporator comprises a tube and shell heat exchanger.

12. A system as in claim 8, wherein said evaporator is fluidly connected to a fuel cell stack, said fuel cell stack including said fuel cell.

13. A system as in claim 8, wherein said heat generated by said fuel cell is removed by a cooling cycle, said cooling cycle comprising a pump and a heat exchanger, said pump and said heat exchanger being fluidly connected to said fuel cell and said evaporator.

14. A system as in claim 13, wherein said coolant is circulated in said cooling cycle from said fuel cell to said evaporator and then to said heat exchanger by said pump.

15. A system as in claim 8, wherein said liquid droplets comprise de-ionized water.

16. A system as in claim 8, wherein said mist humidifier and said evaporator are located within an inlet manifold of a fuel cell stack.

17. A system as in claim 12, wherein said fuel cell stack inlet temperature of said reactant gas is set by said evaporator to substantially the operating temperature of said fuel cell stack.

18. A system as in claim 8, wherein said reactant gas is saturated with water vapor.

19. A system as in claim 8, wherein said mist humidifier comprises a spray nozzle.

* * * * *